United States Patent

[11] 3,621,468

[72] Inventor Helmut Stechmann
Schwenningen am Neckar, Germany
[21] Appl. No. 863,073
[22] Filed Oct. 2, 1969
[45] Patented Nov. 16, 1971
[73] Assignee Kienzle Uhrenfabriken GmbH
Schwenningen am Neckar, Germany
[32] Priority Oct. 5, 1968
[33] Germany
[31] P 18 01 444.3

[54] AMPLITUDE STABILIZED TRANSISTOR DRIVE CIRCUIT FOR MECHANICAL OSCILLATORY SYSTEM
16 Claims, 11 Drawing Figs.

[52] U.S. Cl. .......... 331/109, 58/23 AO, 318/128, 331/116 M, 331/183
[51] Int. Cl. .......... G04c 3/00, H03b 5/30
[50] Field of Search .......... 331/109, 116 M, 154, 183; 318/128, 132; 58/23 A, 23 AO, 28 A

[56] References Cited

UNITED STATES PATENTS 3,293,568 12/1966 Ganter et al. .......... 331/116 M X

FOREIGN PATENTS 795,942 10/1968 Canada .......... 331/116 M

*Primary Examiner*—Roy Lake
*Assistant Examiner*—Siegfried H. Grimm
*Attorney*—McGlew and Tuttle

ABSTRACT: An electronic circuit for driving a mechanical oscillatory system with stabilization of the amplitude of the system includes a working transistor having a working winding in its emitter-collector circuit and a control winding in its base-emitter circuit, with its working point being determined by a voltage divider having a tap connected to its base. A second transistor is provided and its emitter-circuit forms one branch of the voltage divider, with the control winding being also connected in the base-emitter circuit of the second transistor. Thereby, control signals of the control winding, effecting modulation of the working transistor, simultaneously effect modulation of the second transistor in dependence on the amplitude of the oscillatory system. The transistors may be identical or may be complementary. When the transistors are complementary, the control winding is connected between the bases of the two transistors.

INVENTOR:
HELMUT STECHMANN

By McGlew and Toren
Attorneys

INVENTOR:
HELMUT STECHMANN

By McGlew and Toren
Attorneys

AMPLITUDE STABILIZED TRANSISTOR DRIVE CIRCUIT FOR MECHANICAL OSCILLATORY SYSTEM

BACKGROUND OF THE INVENTION

In the known electronic circuits for driving a mechanical oscillatory system with stabilization of the amplitude of the system, there is arranged, in one branch of the voltage divider, a temperature-dependent resistance whose purpose is to compensate the temperature variation of the transistor by a corresponding displacement or adjustment of the working point of the transistor. However, stabilization of the amplitude of the oscillatory system, upon variation of the supply voltage, such as a battery voltage, or under external mechanical influences on the oscillatory system, is not possible.

There are also known circuits of this type wherein the amplitude of the mechanical oscillatory system is maintained constant during voltage variation. For this purpose, a working transistor is used and has a control winding in its base-emitter circuit and a working winding in its emitter-collector circuit. The base of the transistor is also connected to a condenser, which is charged by the battery or the like through a resistance. Thus, the charge of the condenser is dependent on the supply voltage. A second transistor releases the charge of the condenser when the first transistor is conductive. The charge of the condenser, which then becomes operative at the base of the working transistor, is directed in opposition to the induction voltage of the control winding. As the condenser is charged by the supply voltage through a resistance while the second transistor is nonconducting, the condenser charge is proportional to the supply voltage. Thereby, there acts, at the base of the working transistor, a different voltage which increases with decreasing supply voltage, so that the intensity of the drive pulses supplied to the working winding remains constant. Such an arrangement is shown, for example, in German Auslegeschrift 1194455.

However, a disadvantage of this arrangement is that amplitude variations of the mechanical oscillatory system, due to mechanical influences, are not compensated thereby. If, for example, due to an increased delivery moment the amplitude of the oscillatory system decreases, this does not manifest itself in an increased intensity of the drive pulses supplied to the working winding.

In another type of circuit for driving a mechanical oscillatory system, the emitter-collector circuit of a second transistor is connected in parallel with the control winding, and a second control coil is connected in the base-emitter circuit of the second transistor and, together with the first control coil, is inductively loaded. With increasing amplitude, the second transistor is increasingly modulated so that, through its emitter-collector circuit, it finally acts as a low resistance for the control voltage induced in the control winding. Therefore, the control voltage operative at the working transistor is reduced. The disadvantage of this arrangement is the additional cost of a second control winding. Such an arrangement is shown, for example, in German Auslegeschrift 1209961.

Instead of the second transistor, a diode may be connected in parallel with the control winding, as suggested in German Auslegeschrift 1209961. However, all that this reflects is that the amplitude of the mechanical oscillatory system does not exceed an upper limit amplitude and, below this upper limit amplitude, there is no stabilizing effect.

There is further known a circuit which serves for driving a continuously rotating motor, the working winding of the motor being connected in the emitter-collector circuit and a control winding in the base-emitter circuit of a transistor. This motor drives a balance through a transmission. To maintain the amplitude of the balance constant, there is induced, by the balance, in a second control winding, a voltage which actuates a second transistor, with a condenser being charged, The condenser charge is directed counter to the control voltage in the control winding of the motor, so that with increasing balance amplitude, the drive pulses for the motor are reduced in intensity. Such an arrangement is shown, for example, in Swiss provisional patent 5512/62. However, this circuit is suitable only for a clock type oscillatory system with a balance driven mechanically through a transmission.

SUMMARY OF THE INVENTION

This invention relates to electronic circuits for driving mechanical oscillatory systems and, more particularly, to an improved system of this type in which fluctuations in the supply voltage or external mechanical influence on the oscillatory system do not influence the amplitude of the oscillatory system.

In accordance with the invention, an electronic circuit for driving a mechanical oscillatory system is free of the disadvantages of the above-mentioned electronic driving circuits. In particular, the amplitude of the oscillatory system, or, respectively, the induction voltage proportional to the amplitude, in the control winding, serves as a measure for the regulation of the amplitude.

More specifically, in accordance with the invention, the emitter-collector circuit of a second transistor is included in one branch of the voltage divider, and the control winding is included in the base-emitter circuit of the second transistor. The control signal of the control winding, applied to the working transistor, at the same time actuates the second transistor in accordance with the amplitude.

An object of the invention is to provide an improved electronic circuit for driving mechanical oscillatory systems.

A further object of the invention is to provide such a system in which the amplitude of the oscillatory system is stabilized.

A further object of the invention is to provide such a system in which fluctuations in the supply voltage, such as a battery voltage, do not influence the amplitude of the oscillatory system.

Another object of the invention is to provide such an electronic circuit in which external mechanical influences on the oscillatory system do not influence the amplitude thereof.

For an understanding of the principles of the invention, reference is made to the following description of typical embodiments thereof as illustrated in the accompanying drawings.

BRIEF DESCRIPTION OF THE DRAWINGS

IN THE DRAWINGS

Figure 1:
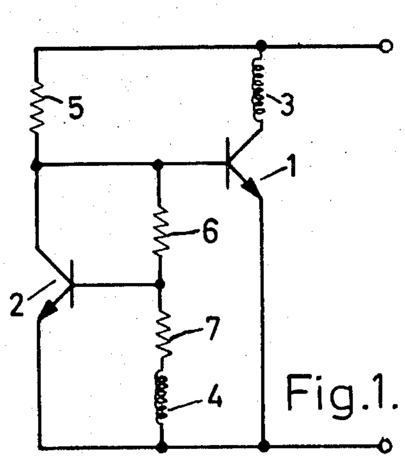
Figure 11:
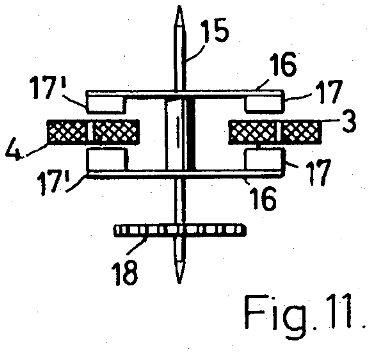
Figure 2:
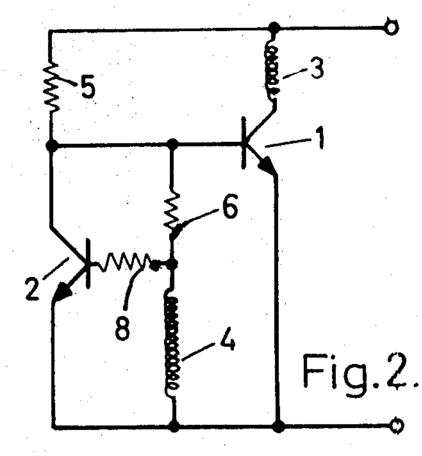
Figure 3:
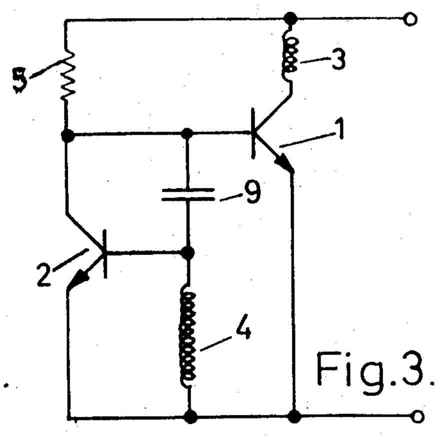
Figure 4:
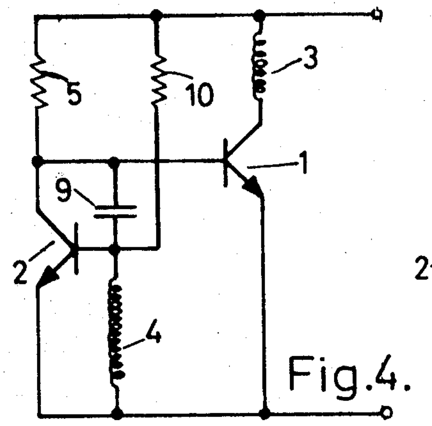
Figure 5:
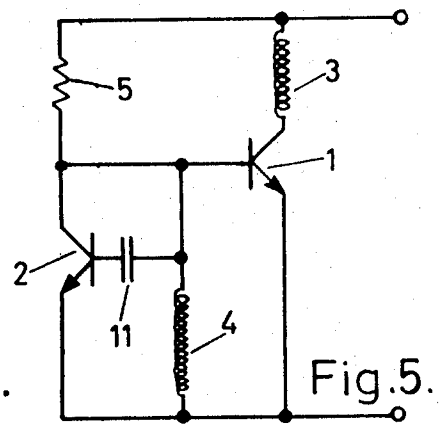
Figures 6, 7, 8, 9, 10:
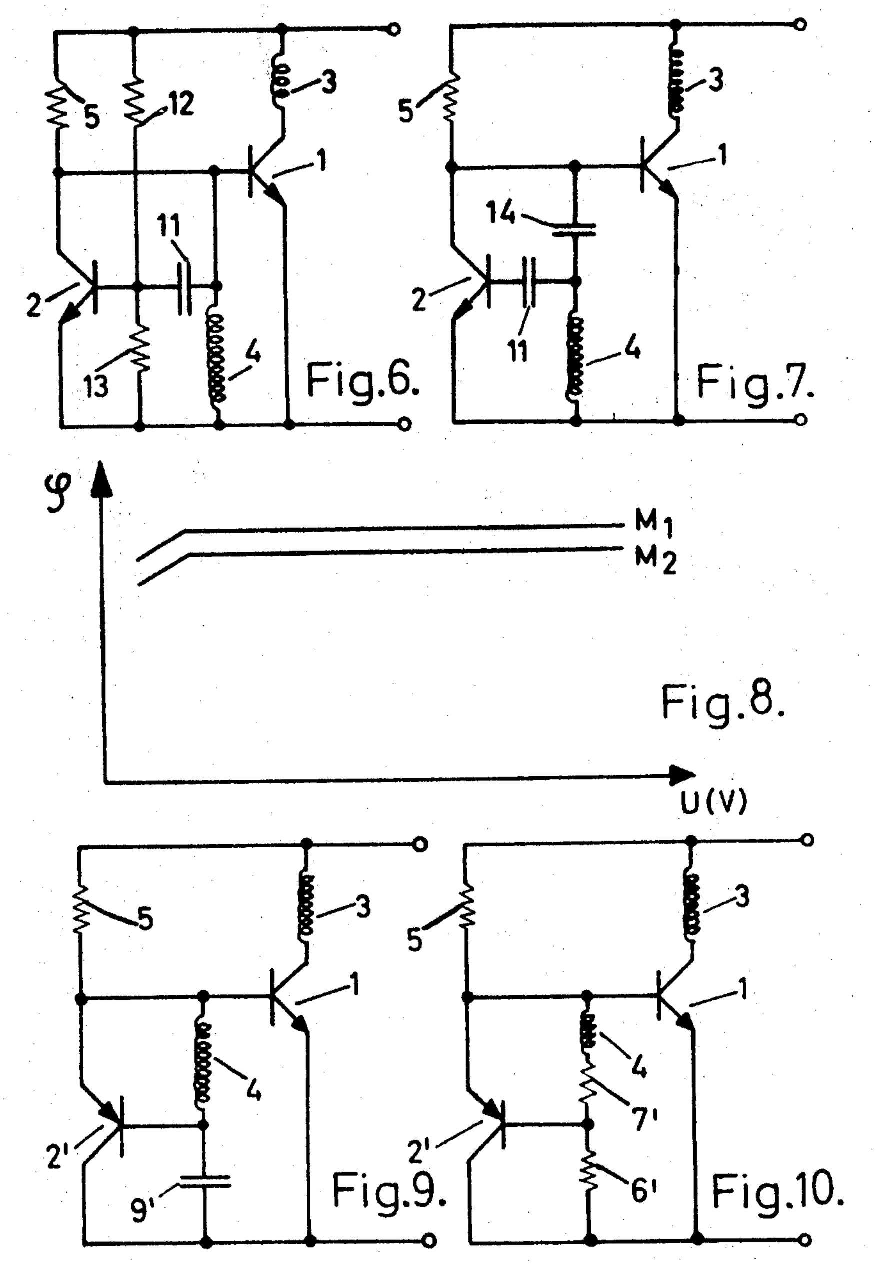

FIG. 1 is a schematic wiring diagram of a first embodiment of the invention;

FIG. 2 is a schematic wiring diagram illustrating a variant of the circuit shown in FIG. 1;

FIG. 3 is a schematic wiring diagram of another embodiment of the invention in which the circuit is self-starting, FIG. 4 is a schematic wiring diagram illustrating a variant of the circuit shown in FIG. 3;

FIG. 5 is a schematic wiring diagram of a third embodiment of the invention;

FIG. 6 is a schematic wiring diagram of a variant of the circuit shown in FIG. 5;

FIG. 7 is a schematic wiring diagram of another variant of the circuit shown in FIG. 5 and which is suitable for selfstarting;

FIG. 8 is a graphical representation illustrating the independence of the amplitude with respect to the voltage at different delivery moments;

FIG. 9 is a schematic wiring diagram of the circuit shown in FIG. 3 but using complementary transistors;

FIG. 10 is a schematic wiring diagram of the circuit shown in FIG. 1 but using complementary transistors; and FIG. 11 is a somewhat schematic view of a mechanical oscillatory system embodying the invention.

DESCRIPTION OF THE PREFERRED EMBODIMENTS

In the embodiment of the invention shown in FIG. 1, a working transistor 1 has the working or driving winding 3 in its emitter-collector circuit. Control winding 4 is arranged in the base-emitter circuit of transistor 1. The base of transistor 1 has applied thereto the voltage at a tap of a voltage divider formed by the resistance 5 and the emitter-collector circuit of a second transistor 2. Control winding 4 controls both the base of transistor 1 and the base of transistor 2.

If a voltage is induced in control winding 4, the induced voltage results in the emitter-collector circuit of transistor 1 becoming conducting. At the same time, however, this inductive voltage in control winding 4 effects a reduction of the resistance of the emitter-collector circuit of transistor 2 as soon as the threshold voltage at the base of transistor 2 is exceeded. The resistance of the base-emitter circuit of transistor 2 thus is dependent on the magnitude of the voltage induced in control winding 4. This induced voltage, in turn, is dependent on the magnitude of the amplitude of the mechanical oscillatory system.

As will be clear from FIG. 1, a variation of the resistance of the emitter-collector circuit of transistor 2 effects a displacement of the working point of transistor 1. A displacement of this working point, due to a greater amplitude of the mechanical oscillator, however, brings about, at the same time, the induction pulses of control winding 4 resulting in a lesser modulation of transistor 1. Thereby, the amplitude of the mechanical oscillatory system is maintained at a certain value.

The base of transistor 2 is biased to a certain potential by a voltage divider circuit consisting of the resistances 5, 6 and 7 and the resistance of control winding 4. This bias of the base of transistor 2 effects an additional voltage stabilization, and thus influences the control characteristic. When identical types of transistors are used for the transistors 1 and 2, winding 4 is in the voltage divider branch extending between the base of second transistor 2 and one potential supply conductor.

FIG. 2 illustrates a variation of the circuit shown in FIG. 1, wherein a resistance 8 is interposed between the base of second transistor 2 and a series connection of control winding 4 and a resistance 6.

Another embodiment of the invention is illustrated in FIG. 3, wherein identical transistors are used with the base of working transistor 1 being connected through a capacitor 9 with the base of second transistor 2. The value of capacitor or condenser 9 is not critical. However, if the capacity of this condenser is selected accordingly, it is possible to obtain a self-starting of the mechanical oscillatory system since, with the oscillatory system motionless, condenser 9 is charged through resistor 5. This charging of condenser 9 causes conduction of transistor 1 as soon as the voltage at condenser 9 has reached the input threshold voltage of transistor 1. In this embodiment of the invention, control winding 4 is connected between the base of second transistor 2 and one potential supply line.

FIG. 4 illustrates a circuit of the type shown in FIG. 3, with the difference that the base of the second transistor 2 is biased to a certain potential through the medium of a series resistance 10. Resistance 10 and the resistance of control winding 4, in this modification of the invention, form a voltage divider. As has been mentioned above, the control characteristic can be influenced by this bias. The resistance of the collector-emitter circuit of second transistor 2 is proportional to the voltage induced in control winding 4 and to the bias applied to the base of second transistor 2.

FIG. 5 illustrates a further embodiment of the invention in which, instead of the condenser 9 of FIG. 3, a condenser 11 is connected between the base of second transistor 2 and the tap connected to control winding 4.

If it is desired to bias the base of transistor 2, in the embodiment of the invention shown in FIG. 5, a voltage divider including resistances 12 and 13, as shown in FIG. 6, can be used.

Self-starting is possible by using a condenser 14, as shown in FIG. 7, connected in series with resistance 5 and control winding 4. The effect of condenser 14 is the same as that of condenser 9 of FIG. 3.

Naturally, condenser 14 can also be used in the circuit shown in FIGS. 1 and 2, namely in parallel with the resistance 6, so that also, with these circuits, self-starting of the mechanical oscillatory system can be obtained.

In the circuit embodiments described up to now, pairs of identical transistors are used Since control winding 4 is to be included both in the base-emitter circuit of working transistor 1 and in the base-emitter circuit of second transistor 2, winding 4 is always connected between the base of second transistor 2 and one supply line.

However, the same circuits are possible using complementary transistors, as shown in FIGS. 9 and 10. Thus, the circuit shown in FIG. 9 corresponds to that shown in FIG. 3 and the circuit shown in FIG. 10 corresponds to that shown in FIG. 1. When using a complementary transistor 2′, control winding 4 is always connected between the base of second transistor 2′ and the base of working transistor 1. An equivalent arrangement can be used, of course, where the circuits correspond to those shown in FIGS. 2, 4, 5, 6 and 7, also involving complementary transistors.

FIG. 8 graphically illustrates the behavior of the oscillation amplitude at variable voltage and variable delivery moments of the mechanical oscillatory system, and in this FIG., $\Phi$ is the amplitude of the oscillatory system and U the battery voltage, with M representing the delivery moment. In a practical example, FIG. 8 shows, in a circuit for a car clock, a constancy of the amplitude between 6 volts and 20 volts. If the seconds shaft is braked with a moment of 100 p.m.m., an amplitude decrease of only 3 percent, relative to the oscillation amplitude with an unbraked seconds shaft, is observable.

The circuit is thus very effective for variations of the voltage as well as for variations in the drive moment. A further advantage is the adjustability of the control characteristic by proper selection of the working point of second transistor 2. Furthermore, a good self-starting of the mechanical oscillatory system can be obtained with the invention control circuit. It is essential, for the good control behavior, that the instantaneous value of the oscillation amplitude and of the voltage provides a control signal which occurs immediately and without time delay with the control signal for the working transistor.

FIG. 11 illustrates a construction of a balance oscillatory system wherein the fixed windings 3 and 4 are overswung by permanent magnets 17, 17′. The permanent magnets 17, 17′ are arranged on oscillator sheets or plates 16 fastened on balance shaft 15, which also carries spiral spring 18.

While specific embodiments of the invention have been shown and described in detail to illustrate the application of the principles of the invention, it will be understood that the invention may be embodied otherwise without departing from such principles.

What is claimed is:

1. In an electronic circuit for driving a mechanical oscillatory system with stabilization of the amplitude of this system, of the type including a working transistor having a base, an emitter and a collector, a working winding in its emitter-collector circuit and a control winding in its base-emitter circuit, with the working point of the transistor being determined by a voltage divider having a tap connected to the base of the working transistor, the improvement comprising, in combination, a second transistor having a base, an emitter and a collector, the emitter-collector circuit of said second transistor forming one branch of said voltage divider; said control winding being also connected in the base-emitter circuit of said second transistor; whereby control signals of said control winding, effecting modulation of said working transistor, also effect modulation of said second transistor in dependence on the amplitude of the oscillatory system.

2. In an electronic circuit for driving a mechanical oscillatory system, the improvement claimed in claim 1, in which the emitter-collector circuit of said second transistor is in parallel with the base-emitter circuit of said working transistor.

3. In an electronic circuit for driving a mechanical oscillatory system, the improvement claimed in claim 1, in which said working transistor and said second transistor are identical types of transistors.

4. In an electronic circuit for driving a mechanical oscillatory system, the improvement claimed in claim 1, in which said second transistor is of the type complementary to said working transistor.

5. In an electronic circuit for driving a mechanical oscillatory system, the improvement claimed in claim 3, in which the base of said working transistor and the base of said second transistor are connected to the same terminal of said control winding.

6. In an electronic circuit for driving a mechanical oscillatory system, the improvement claimed in claim 4, in which the base of said working transistor is connected to one terminal of said control winding and the base of said second transistor is connected to the opposite terminal of said control winding.

7. In an electronic circuit for driving a mechanical oscillatory system, the improvement claimed in claim 1, including a voltage divider connected between the base of said working transistor and one supply line of said circuit; said voltage divider having a tap connected to the base of said second transistor; one branch of said voltage divider including said control winding.

8. In an electronic circuit for driving a mechanical oscillatory system the improvement claimed in claim 7, including a resistance connected between said last mentioned tap and the base of said second transistor.

9. In an electronic circuit for driving a mechanical oscillatory system, the improvement claimed in claim 7, in which said control winding is connected in the branch of said voltage divider between the base of said second transistor and one supply line for said circuit.

10. In an electronic circuit for driving a mechanical oscillatory system, the improvement claimed in claim 7, in which said control winding in included in the branch of said voltage divider between the base of said working transistor and the base of said second transistor.

11. In an electronic circuit for driving a mechanical oscillatory system, the improvement claimed in claim 1, including a condenser and said control winding connected between the base of said working transistor and one supply line of said circuit; the base of said second transistor being connected to the junction of said condenser and said control winding.

12. In an electronic circuit for driving a mechanical oscillatory system, the improvement claimed in claim 11, in which said control winding is connected between the base of said second transistor and said one supply line.

13. In an electronic circuit for driving a mechanical oscillatory system, the improvement claimed in claim 11, in which said control winding in connected between the base of said working transistor and the base of said second transistor.

14. In an electronic circuit for driving a mechanical oscillatory system, the improvement claimed in claim 1, including a condenser connected to the base of said second transistor and to said control winding.

15. In an electronic circuit for driving a mechanical oscillatory system, the improvement claimed in claim 11, including a voltage divider connected in parallel with the working transistor and the working winding, and having a tap; and means connecting said last-mentioned tap to the base of said second transistor.

16. In an electronic circuit for driving a mechanical oscillatory system, the improvement claimed in claim 1, in which said voltage divider includes a resistance connected in series with a condenser; the base of said working transistor being connected to said voltage divider between said resistance and said condenser; said condenser being connected, together with said control winding, in the base-emitter circuit of said working transistor.

* * * * *